United States Patent
Sugihara et al.

(10) Patent No.: US 11,176,948 B2
(45) Date of Patent: Nov. 16, 2021

(54) AGENT DEVICE, AGENT PRESENTATION METHOD, AND STORAGE MEDIUM

(71) Applicant: HONDA MOTOR CO., LTD., Tokyo (JP)

(72) Inventors: Hiroshi Sugihara, Wako (JP); Ryosuke Tanaka, Wako (JP); Atsushi Sekiguchi, Wako (JP); Yuki Matsuura, Wako (JP); Wataru Endo, Wako (JP); Eisuke Soma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 16/677,733

(22) Filed: Nov. 8, 2019

(65) Prior Publication Data

US 2020/0152203 A1    May 14, 2020

(30) Foreign Application Priority Data

Nov. 14, 2018  (JP) .............................. JP2018-213589

(51) Int. Cl.
| | |
|---|---|
| *G10L 17/00* | (2013.01) |
| *H04N 5/225* | (2006.01) |
| *G06K 9/00* | (2006.01) |
| *G06F 3/16* | (2006.01) |
| *H04R 1/40* | (2006.01) |
| *H04R 3/12* | (2006.01) |
| *G10L 15/24* | (2013.01) |

(52) U.S. Cl.
CPC .............. *G10L 17/00* (2013.01); *G06F 3/167* (2013.01); *G06K 9/00832* (2013.01); *G10L 15/24* (2013.01); *H04N 5/2253* (2013.01); *H04R 1/403* (2013.01); *H04R 3/12* (2013.01)

(58) Field of Classification Search
CPC ......... G10L 17/00; G10L 15/24; G10L 15/22; G10L 17/26; G10L 2015/223; G06F 3/167; G06K 9/00832; G06K 9/00302; H04R 1/403; H04R 3/12; H04R 2499/13; H04S 7/40; H04N 5/2253; H04N 5/2628; H04N 7/18; G01C 21/3697
See application file for complete search history.

(56) References Cited

U.S. PATENT DOCUMENTS

| | | | |
|---|---|---|---|
| 6,249,720 B1 * | 6/2001 | Kubota | B60R 16/0232 340/990 |
| 2014/0309806 A1 * | 10/2014 | Ricci | G06F 21/32 701/1 |

FOREIGN PATENT DOCUMENTS

| | | | | |
|---|---|---|---|---|
| JP | 2018-103880 | | 7/2018 | |
| WO | WO-2017081960 A1 * | | 5/2017 | ............. B60R 16/02 |

* cited by examiner

*Primary Examiner* — Yogeshkumar Patel
(74) *Attorney, Agent, or Firm* — Amin, Turocy & Watson, LLP

(57) ABSTRACT

An agent device includes a display unit, a microphone configured to collect a voice in an occupant compartment, a plurality of speakers configured to enable localization of a sound image through a combination of outputs, and an agent controller configured to cause the display unit to display an agent image and cause the speakers to output sounds, wherein the agent controller is configured to identify a speaking person who has spoken the voice collected by the microphone among occupants in a vehicle and to cause the agent image to be displayed in a mode of talking to the occupant in a partial area of the display unit near the speaking person while causing a sound image to be localized at a display position of the agent image.

12 Claims, 11 Drawing Sheets

AGENT DEVICE, AGENT PRESENTATION METHOD, AND STORAGE MEDIUM

CROSS-REFERENCE TO RELATED APPLICATION

Priority is claimed on Japanese Patent Application No. 2018-213589, filed Nov. 14, 2018, the content of which is incorporated herein by reference.

BACKGROUND

Field of the Invention

The present invention relates to an agent device, an agent presentation method, and a storage medium.

Description of Related Art

A display system that includes a plurality of display units around the driver's seat and performs map and guidance display for a navigation system, video content display, or the like on a preset display unit among the plurality of display units on the basis of operation inputs for settings of the navigation system, selection or playback of content such as videos, or the like is known in the related art (see, for example, Japanese Unexamined Patent Application, First Publication No. 2018-103880).

However, in the technology of the related art, when there are a plurality of occupants, a display result based on an operation input may not be displayed at a position that can be easily seen by an occupant who has performed the operation. As a result, if the technology of the related art is applied to a device that controls an agent image, the agent may behave unnaturally.

SUMMARY

Aspects of the present invention have been made in view of such circumstances and it is an object of the present invention to provide an agent device, an agent presentation method, and a storage medium that can cause an agent to behave naturally.

The agent device, the agent presentation method, and the storage medium according to the present invention adopt the following configurations.

(1) An agent device according to an aspect of the present invention includes a display unit, a microphone configured to collect a voice in an occupant compartment, a plurality of speakers configured to enable localization of a sound image through a combination of outputs, and an agent controller configured to cause the display unit to display an agent image and cause the speakers to output sounds, wherein the agent controller is configured to identify a speaking person who has spoken the voice collected by the microphone among occupants in a vehicle and to cause the agent image to be displayed in a mode of talking to the occupant in a partial area of the display unit near the speaking person while causing a sound image to be localized at a display position of the agent image.

(2) In the above aspect (1), the display unit has a display area that is wide enough that two or more of the occupants recognize the agent image as being displayed at a position facing the two or more occupants.

(3) In the above aspect (2), the display unit includes individual displays facing the occupants and/or includes a display provided over a vicinity of the plurality of occupants.

(4) In the above aspect (3), the agent device further includes a camera configured to image the occupant compartment, wherein the agent controller is configured to identify the speaking person by analyzing an image including the occupant captured by the camera.

(5) In the above aspect (4), the agent controller is configured to identify whether the speaking person is speaking toward the agent image or speaking to another occupant by analyzing the image including the occupant captured by the camera.

(6) In the above aspect (5), the agent controller is configured to identify that the speaking is for the agent image when a silent time equal to or greater than a threshold has been detected after the occupant completes the speaking as a result of analyzing the voice collected by the microphone or a result of analyzing the imaging of the camera.

(7) In the above aspect (5) or (6), the agent controller is configured to identify whether or not the speaking is for the agent image on the basis of an evaluation of component analysis of the voice collected by the microphone.

(8) In any one of the above aspects (5) to (7), the agent controller is configured to identify that a driver has performed the speaking for the agent image when content indicated by the voice relates to a driving operation.

(9) In any one of the above aspects (1) to (8), the agent controller is configured to make a localization position of the sound image non-directional when the speaking person cannot be determined.

(10) An agent presentation method according to an aspect of the present invention includes collecting a voice in an occupant compartment, causing a display unit to display an agent image and causing a plurality of speakers configured to enable localization of a sound image through a combination of outputs to output sounds, and identifying a speaking person who has spoken the collected voice among occupants in a vehicle and displaying the agent image in a mode of talking to the occupant in a partial area of the display unit near the speaking person while localizing a sound image at a display position of the agent image.

(11) A storage medium according to an aspect of the present invention is a (non-transitory computer-readable) storage medium that stores a program causing a computer to collect a voice in an occupant compartment, cause a display unit to display an agent image and cause a plurality of speakers configured to enable localization of a sound image through a combination of outputs to output sounds, and identify a speaking person who has spoken the collected voice among occupants in a vehicle and display the agent image in a mode of talking to the occupant in a partial area of the display unit near the speaking person while localizing a sound image at a display position of the agent image.

According to the above aspects (1) to (11), it is possible to cause the agent to behave naturally.

DETAILED DESCRIPTION OF THE INVENTION

Hereinafter, embodiments of an agent device, an agent presentation method, and a program according to the present invention will be described with reference to the drawings. An agent device that is mounted in a vehicle and has an interactive agent function will be described as an example of the agent device. The agent device is, for example, a device that provides various types of information in response to a request from an occupant of the vehicle or controls equipment in the vehicle while dialoguing with the occupant. The agent device may also be a device that determines the occupant's states from the occupant's facial expression and vocal tone and assists driving or that learns the occupant's lifestyle and preferences and proposes options according to the situation. To make an occupant view a dialogue counterpart, the agent device displays, for example, an image of an anthropomorphized animal or character (hereinafter referred to as an agent image) on a display unit. The agent image includes, for example, a facial image that at least enables the viewer to recognize its facial expression and face orientation. The agent image is, for example, an image in which parts imitating eyes and the nose are represented in its face area and which allows the face orientation to be recognized on the basis of the positions of parts in the face area. The agent image may also be an image that the viewer senses to be three dimensional and includes a head image in a three-dimensional space such that the face orientation is recognized by the viewer. The agent device is realized, for example, through combined use of natural language functions (processing that understands the structure and meaning of text), a dialogue control process, a search process, and the like in addition to a voice recognition process (a process that converts voice into text) that recognizes the occupant's voice. Some or all of these processes are realized by an artificial intelligence (AI) technology. Some or all of components for performing these processes are provided in a server device or the like that can communicate with the vehicle.

[Overall Structure]

Figure 1:
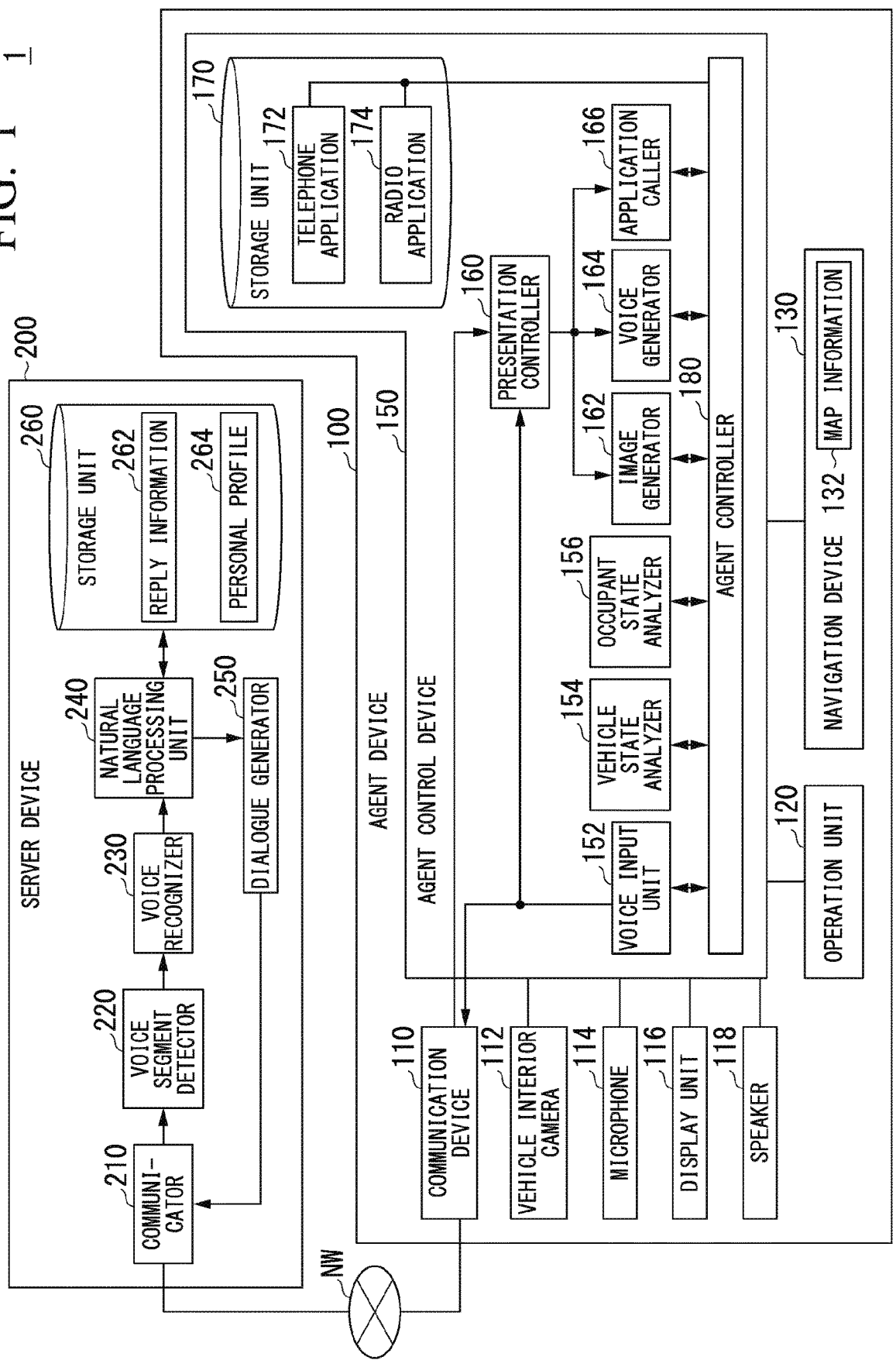
FIG. 1 is a configuration diagram of an agent system including an agent device according to an embodiment.

FIG. 1 is a configuration diagram of an agent system 1 including an agent device according to an embodiment. The agent system 1 includes an agent device 100 and a server device 200. The agent device 100 and the server device 200 are connected, for example, in a state where data can be transmitted and received through a network NW such as the Internet, a wide area network (WAN), or a local area network (LAN). Although the server device 200 can communicate with a plurality of agent devices 100, it is assumed below that the server device 200 communicates with one agent device 100 for the sake of convenience of description.

The agent device 100 dialogues with an occupant of a vehicle M, issues a request to the server device 200 in response to an inquiry from the occupant by voice or the like, and presents a reply to the request obtained from the server device 200 to the occupant in a predetermined output manner. In the following description, the occupant is, for example, an occupant seated in a driver's seat (hereinafter referred to as a driver) and may be an occupant (passenger) seated in a front passenger seat or a rear seat in addition to (or instead of) the occupant seated in the driver's seat.

The agent device 100 includes, for example, a communication device 110, a vehicle interior camera 112, a microphone 114, a display unit 116, a speaker 118, an operation unit 120, a navigation device 130, and an agent control device 150. These devices or apparatuses are connected to each other by a multiplex communication line or a serial communication line such as a controller area network (CAN) communication line, a wireless communication network, or the like. The components shown in FIG. 1 are merely examples and some of the components may be omitted or other components may be added.

The communication device 110 communicates with other vehicles and the server device 200 via the network NW, for example, using a cellular network, a Wi-Fi network, Bluetooth (registered trademark), or dedicated short range communication (DSRC).

The vehicle interior camera 112 captures, for example, an image including the face of an occupant seated in a seat installed in the occupant compartment of the vehicle M. The vehicle interior camera 112 is a digital camera using a solid-state imaging device such as a charge coupled device (CCD) or a complementary metal oxide semiconductor (CMOS). The vehicle interior camera 112 images an occupant, for example, at predetermined times. The captured image of the vehicle interior camera 112 is output to the agent control device 150.

The microphone 114 is a voice input device that collects voice in the occupant compartment. For example, the microphone 114 is installed on a steering wheel. The microphone 114 is installed near the front of an occupant seated in a seat in the occupant compartment. For example, the microphone 114 is installed near a map lamp, on the steering wheel, on an instrument panel, or on a seat. Microphones 114 may be distributed and installed in two or more locations.

The display unit 116 is installed near the front of an occupant seated in a seat in the occupant compartment and has at least a display area that is wide enough that an occupant seated in the driver's seat or the front passenger seat recognizes the agent image as being displayed at a position facing the occupant. The speaker 118 is installed near a seat in the occupant compartment or near the display unit 116. A plurality of display units 116 and speakers 118 may be installed in the occupant compartment.

Figure 2:
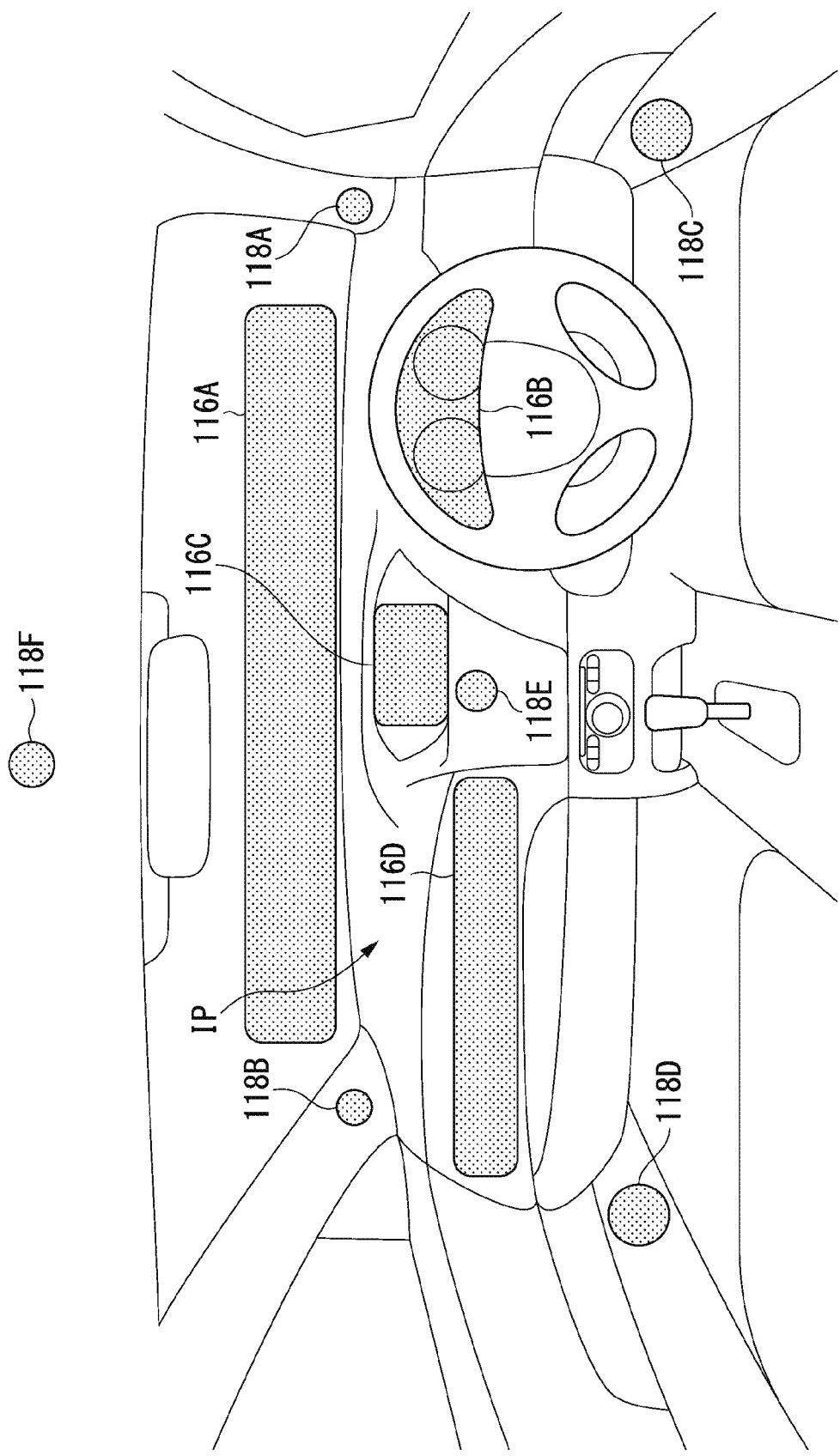
FIG. 2 is a diagram schematically showing display units and speakers installed in a vehicle.

FIG. 2 is a diagram schematically showing display units and speakers installed in the vehicle M. Display units 116A to 116D and speakers 118A to 118F are installed in the occupant compartment of FIG. 2. The display unit 116A is, for example, a head-up display (HUD) device. The HUD device is a device that allows an image to be viewed such that it is superimposed on a landscape. The HUD device is, for example, a device which projects light including an image on a front windshield or a combiner of the vehicle M to allow an occupant to view a virtual image. The occupant who is allowed to view the image by the HUD device is mainly the driver or an occupant seated in the front passenger seat, but may also be an occupant seated in the rear seat. The display unit 116A is provided over the vicinity of the occupant seated in the driver's seat ST1 and the occupant seated in the front passenger seat ST2. For example, the display unit 116A may be installed on a lower region of the front windshield which does not obstruct the driver's field of view. The display unit 116B displays an image associated with a navigation process executed by the navigation device 130, other images, or the like.

The display unit 116B is installed near the front of the driver's seat (for example, a seat closest to the steering wheel) on an instrument panel IP at a position where the occupant can view it through a gap in the steering wheel or over the steering wheel. The display unit 116B is, for example, a liquid crystal display (LCD) or organic electroluminescence (EL) display device. The display unit 116B displays, for example, images of the speed of the vehicle M, the engine speed, the remaining fuel amount, the radiator water temperature, the travel distance, or other information.

The display unit 116C is installed near the center of the instrument panel IP. The display unit 116C is, for example, an LCD or organic EL display device, similar to the display unit 116B. The display unit 116C displays, for example, an image associated with a navigation process executed by the navigation device 130 and other images. The display unit 116C may display television shows, play DVDs, and display content such as downloaded movies.

The display unit 116D is provided near the front of the front passenger seat (a seat adjacent to the driver's seat) on the instrument panel IP. The display unit 116D displays television shows, plays DVDs, and displays content such as downloaded movies. A display unit 116 which obtains information that the occupant can view with a side mirror of the vehicle M using a camera outside the vehicle and displays the obtained information may also be installed in the occupant compartment.

Figure 3:
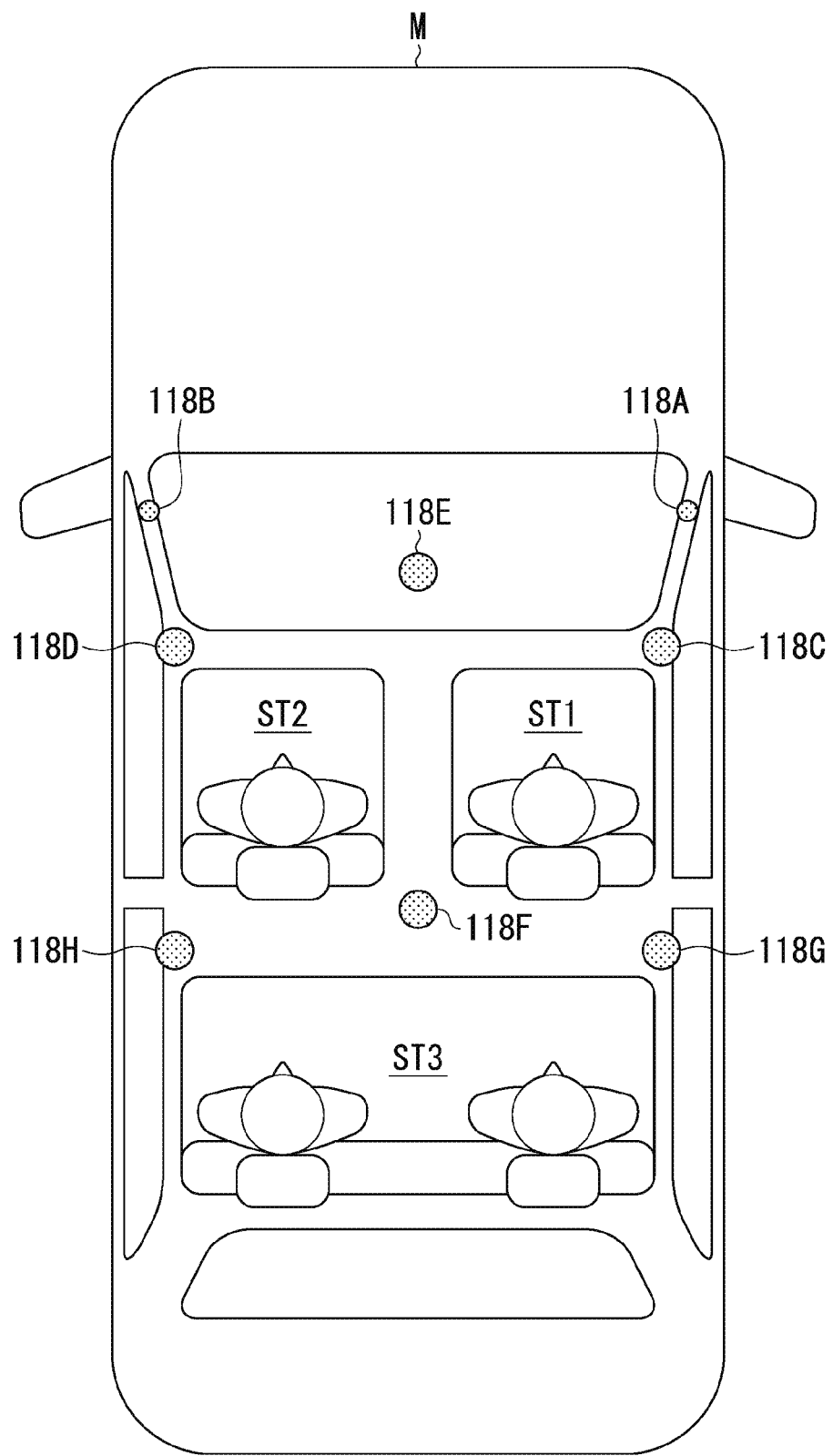
FIG. 3 is a diagram showing the positions of speakers and display units near a rear seat.

In the vehicle M, a display unit 116 may also be provided near the rear seat. FIG. 3 is a diagram showing the positions of speakers and display units near the rear seat. Display units 116E and 116F are, for example, individual displays that are installed near the backs or headrests of the driver's seat ST1 and the front passenger seat ST2 such that they face occupants in the rear seat ST3. When microphones 114 are installed in two or more locations, the microphones 114 may be installed near the installation locations of the display units 116E and 116F.

The speaker 118A and the speaker 118B are installed, for example, on left and right front window columns (so-called A-pillars) of the vehicle M. The speaker 118C is installed on a lower portion of the driver side door and the speaker 118D is installed on a lower portion of the front passenger side door. The speaker 118E is installed near the display unit 116C, that is, near the center of the instrument panel IP. The speaker 118F is installed near the center of the ceiling in the occupant compartment.

In the vehicle M, a speaker may also be provided near the rear seat. In the example of FIG. 3, in addition to the speakers 118A to 118F shown in FIG. 2, speakers 118G and 118H are provided near the rear seat ST3 that is installed behind the driver's seat ST1 and the front passenger seat ST2. Specifically, the speakers 118G and 118H are provided on lower portions of the left and right doors. The speakers 118 may be provided on window columns (so-called B-pillars) provided between the front doors and the rear doors of the vehicle M or may be provided in a direction toward the rear seat.

The operation unit 120 receives a manual operation performed by an occupant. The operation unit 120 includes, for example, switches, buttons, and keys. The operation unit 120 is provided, for example, on the steering wheel or the instrument panel. The operation unit 120 may be configured integrally with the display unit 116 as a touch panel.

The navigation device 130 identifies the position of the vehicle M, for example, on the basis of signals received from global navigation satellite system (GNSS) satellites. The navigation device 130 determines a route from the identified position of the vehicle M (or an arbitrary input position) to a destination that an occupant has input using the operation unit 120 or the display unit 116 (hereinafter referred to as an on-map route) with reference to map information 132. The map information 132 is, for example, information in which road shapes are expressed by links indicating roads and nodes connected by the links. The map information 132 may include road curvatures, point of interest (POI) information, and the like.

The navigation device 130 may perform route guidance using the display unit 116 or the speaker 118 on the basis of the on-map route. The navigation device 130 may be realized, for example, by a function of a terminal device such as a smartphone or a tablet terminal possessed by the occupant. The navigation device 130 may transmit the current position and the destination to the server device 200 or a navigation server via the communication device 110 and acquire a route equivalent to the on-map route from the server device 200 or the navigation server. The navigation device 130 may also be a function of the agent control device 150.

[Agent Control Device]

The agent control device 150 includes, for example, a voice input unit 152, a vehicle state analyzer 154, an occupant state analyzer 156, a presentation controller 160, an image generator 162, a voice generator 164, an application caller 166, a storage unit 170, and an agent controller 180. These components are realized, for example, by a computer processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by hardware and software in cooperation. The program may be stored in the storage unit 170 in advance or may be stored in a removable storage medium such as a DVD or CD-ROM and then installed in the storage unit 170 by mounting the storage medium in a drive device.

The voice input unit 152 receives a voice input from the microphone 114. The voice input unit 152 transmits the received voice (voice stream) to the server device 200 via the communication device 110.

The vehicle state analyzer 154 analyzes states of the vehicle, for example, on the basis of the position of the vehicle M identified by the navigation device 130 and the speed, the acceleration, the angular speed around the vertical axis, the orientation of the vehicle M, and the like acquired by vehicle sensors mounted in the vehicle. The states of the vehicle M include, for example, a state such as whether the vehicle M is stopped or traveling and a state such as whether the vehicle is turning right or left or changing lanes.

The occupant state analyzer 156 performs an analysis process on an image captured by the vehicle interior camera 112 to extract feature information such as a person shape and a face shape, thereby acquiring information regarding the position, a behavior, the line of sight, and facial expression changes of an occupant seated in a seat in the occupant compartment. The behavior of the occupant includes, for example, the direction of the face and the posture of the body of the occupant. The occupant state analyzer 156 may detect the position of the occupant seated in the seat using a pressure sensor or other detection sensors provided on the seat.

The occupant state analyzer 156 may analyze the voice collected by the microphone 114 and determine the occupant's state or estimate the occupant's emotions from the tone of the analyzed voice. When there are a plurality of occupants, the occupant state analyzer 156 may analyze the imaging result of the vehicle interior camera 112 to identify which occupant is the speaking person and may also identify which occupant is the speaking person on the basis of both the imaging result of the vehicle interior camera 112 and the analysis result of the voice collected by the microphone 114. The occupant state analyzer 156 may estimate a line-of-sight target or an attention target of the identified speaking person from the imaging result of the vehicle interior camera 112 and identify whether the occupant is speaking toward the agent image or speaking to another occupant. A method for estimating a talking target of the speaking person will be described later.

The presentation controller 160 controls content that is to be presented to the occupant via the agent image on the basis of reply information with respect to the voice that is transmitted from the voice input unit 152 to the server device 200 (for example, dialogue information generated by the server device 200). The content that is to be presented to the occupant includes, for example, display content to be output on the display unit 116, audio content to be output through the speaker 118, and content for executing an application that realizes each function provided in the vehicle.

The presentation controller 160 may also control the content that is to be presented to the occupant on the basis of the occupant's states analyzed by the occupant state analyzer 156. History information of information input from the occupant and content presented to the occupant may be stored in the storage unit 170, and the presentation controller 160 may learn the occupant's lifestyle and preferences from the stored history information and control content that is to be presented according to the situation.

The image generator 162 generates an agent image and sets a display unit 116 that is to display the generated agent image and a display position of the generated agent image on a screen, such that the agent image is displayed at the set display position on the display unit 116. For example, the image generator 162 may generate an agent image with a changed agent's facial expression on the basis of the content of the voice or the content of the reply information. For example, the image generator 162 generates an agent image with a sad expression when a request from the occupant is unclear and the occupant is asked to input a request again, and generates an agent image with a happy expression when a voice such as "thank you" has been input. The image generator 162 generates an image for displaying the reply information on the display unit 116 (hereinafter referred to as a reply image) and causes the display unit 116 to display the generated reply image.

The voice generator 164 generates a voice for dialogue to be output to the occupant. For example, the voice generator 164 generates a voice for localizing a sound image at a position associated with the display position of the agent image using one or more speakers 118. The localization of the sound image means, for example, determination of the spatial position of a sound source sensed by the occupant by adjusting the volumes of sounds output from the speakers 118 and transmitted to the left and right ears of the occupant. The sound image is determined, for example, on the basis of audio characteristics that the sound source originally has, information on the occupant compartment's environments, and a head-related transfer function (HRTF). The voice generator 164 can localize the sound image at a predetermined position using such a principle.

Figure 4:
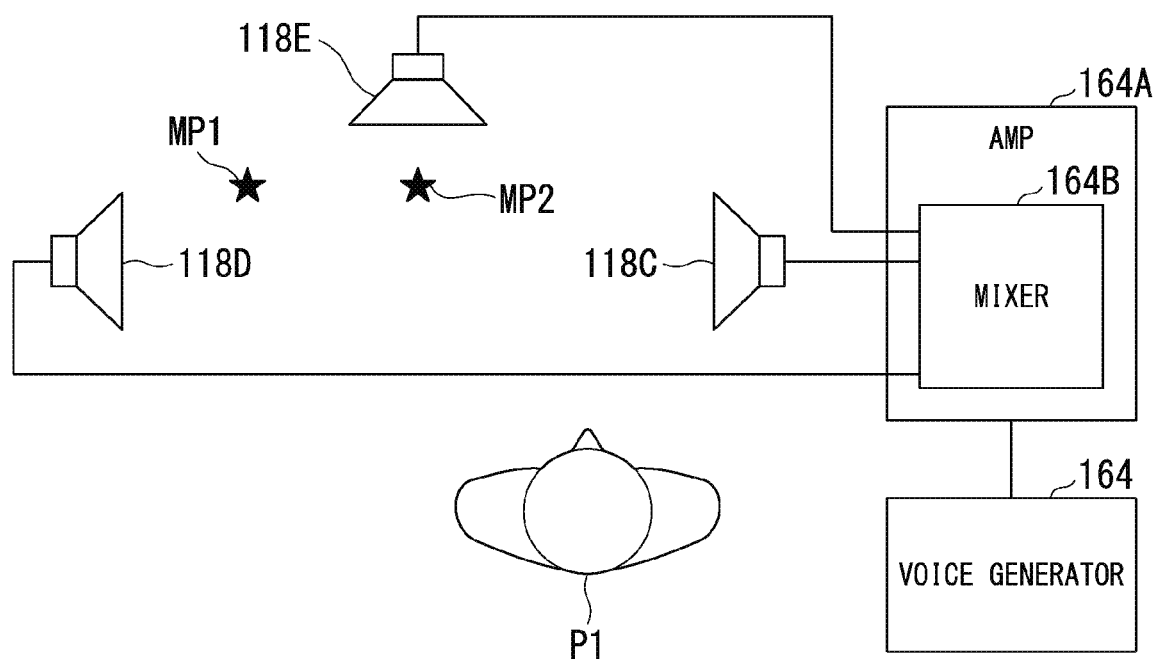
FIG. 4 is a diagram showing how a position at which a sound image is localized is moved.

FIG. 4 is a diagram showing how the position at which a sound image is localized is moved. In FIG. 4, to simplify the description, a sound image is localized using the speakers 118C to 118E described above. In the example of FIG. 4, an AMP 164A and a mixer 164B are provided between the voice generator 164 and the speakers 118C to 118E. The AMP 164A adjusts the volume of a sound output from each of the speakers 118C to 118E under the control of the voice generator 164. For example, the AMP 164A makes it possible to adjust the volume of the sound between 0% and 100% with respect to a reference sound volume (a maximum intensity). The mixer 164B has a function of synthesizing a plurality of input sounds. The mixer 164B also has a function of distributing the sound output to each of the speakers 118C to 118E.

For example, when the AMP 164A outputs 5% of the maximum intensity through the speaker 118C, outputs 80% of the maximum intensity through the speaker 118D, and outputs 15% of the maximum intensity through the speaker 118E for a predetermined voice to be output on the basis of the voice generated by the voice generator 164 to localize a sound image at a spatial position MP1 shown in FIG. 4, it is sensed from the position of the occupant P1 that the sound image is localized at the spatial position MP1 shown in FIG. 4.

When the AMP 164A outputs 45% of the maximum intensity through the speaker 118C, outputs 45% of the maximum intensity through the speaker 118D, and outputs 10% of the maximum intensity through the speaker 118E for a predetermined voice to be output, it can be sensed from the position of the occupant P1 that a sound image is localized at a spatial position MP2 shown in FIG. 4. Thus, it is possible to change the localization position of the sound image by adjusting the volume of a sound output through each of one or more speakers selected from a plurality of speakers provided three-dimensionally in the occupant compartment.

The application caller 166 calls an application selected by the presentation controller 160 from the storage unit 170 and the agent controller 180 executes the called application, thereby realizing the function of the application. For example, when a telephone application 172 is executed by the agent controller 180, communication is performed with an external terminal having a call function via the communication device 110, and thus phone communication with the terminal's owner using the microphone 114 or the speaker 118 is realized. When a radio application 174 is executed by the agent controller 180, a function of acquiring audio information transmitted at a frequency designated by the occupant from a radio station via the communication device 110 and outputting the acquired audio information through the speaker 118 is realized. When a navigation application 176 (not shown) is executed by the agent controller 180, a route guidance function or the like in cooperation with the navigation device 130 is realized.

The storage unit 170 is realized, for example, by an HDD, a flash memory, an electrically erasable programmable read only memory (EEPROM), a read only memory (ROM), a random access memory (RAM), or the like. The storage unit 170 stores, for example, programs that are read and executed by a processor such as the telephone application 172, the radio application 174, and the navigation application 176, and other information.

The agent controller 180 controls execution and stop of each functional unit of the agent control device 150. For example, the agent controller 180 receives a request from each functional unit through an application programming interface (API), selects a functional unit that is to execute processing on the basis of the received request, and causes the selected functional unit to perform processing via the API.

[Server Device]

The server device 200 includes, for example, a communicator 210, a voice segment detector 220, a voice recognizer 230, a natural language processing unit 240, a dialogue generator 250, and a storage unit 260. These components are realized, for example, by a computer processor such as a CPU executing a program (software). Some or all of these components may be realized by hardware (including circuitry) such as an LSI, an ASIC, an FPGA, or a GPU or may be realized by hardware and software in cooperation. The program may be stored in advance in an HDD of the storage unit 170 or a storage device such as a flash memory (a storage device including a non-transitory storage medium) or may be stored in a removable storage medium such as a DVD or CD-ROM and then installed in the storage unit 170 by mounting the storage medium in a drive device.

The communicator 210 communicates with the agent device 100 via the network NW, for example, using a cellular network, a Wi-Fi network, Bluetooth, or DSRC. The communicator 210 receives the voice stream transmitted from the agent device 100. The communicator 210 transmits reply information such as voice, text information, and images generated by the dialogue generator 250 to the agent device 100.

The voice segment detector 220 detects a voice segment from the voice stream transmitted from the agent device 100. For example, the voice segment detector 220 detects a voice segment, for example, on the basis of the amplitude and zero crossing of a voice waveform in the voice stream. The voice segment detector 220 may perform segment detection based on voice/non-voice identification in units of frames based on a Gaussian mixture model (GMM) or may perform segment detection through a process of matching with a database for voice segment detection that is stored in the storage unit 260 or the like in advance.

The voice recognizer 230 recognizes a voice in the voice segment detected by the voice segment detector 220 and converts the voice into text as text information. The voice recognizer 230 may identify features of the speaking person from the voice. The features of the speaking person include, for example, gender, age, and information regarding whether he/she is a driver or a passenger. The voice recognizer 230 may identify individuals through comparison with individual voice feature information stored in a personal profile 264 stored in the storage unit 260.

The voice recognizer 230 may identify feature information of an occupant on the basis of how the occupant calls other occupants or how the occupant is called. For example, upon recognizing that an occupant seated in the front passenger seat calls an occupant seated in the driver's seat as "dad," the voice recognizer 230 recognizes that the word "dad" referred to by the occupant indicates the driver. This function may also be included in the agent controller 180 of the agent control device 150.

When the microphones 114 are constituted by a plurality of sound collection devices and are installed in a distributed manner, the voice input unit 152 generates voice signals collected by the microphones 114, and thus the voice recognizer 230 may estimate relative positions between the speaking person and the microphones 114 on the basis of differences between the signals or may generate a voice signal focusing only on the voice of the speaking person to improve the voice recognition accuracy.

The natural language processing unit 240 executes natural language processing on the text information, which the voice recognizer 230 has generated through conversion into text, and interprets the meaning of the text information. Natural language processing includes morpheme analysis, syntax analysis, semantic analysis, context analysis, and the like. In the morpheme analysis, for example, the text information is divided into units of smallest meaningful expression elements and the word class for each division unit (morpheme) or the like is analyzed.

In the syntax analysis, for example, a sentence structure is analyzed on the basis of a morpheme obtained by the morpheme analysis. In the semantic analysis, for example, a unity having a meaning is determined on the basis of a syntax obtained by the syntax analysis. In the context analysis, for example, a meaning is interpreted in sentence units or context units.

The natural language processing unit 240 generates a command associated with the interpreted meaning. For example, when a meaning such as "how many kilometers to Tokyo Station?," "how long do you run to Tokyo Station?," or the like is interpreted as a result of the interpretation, the natural language processing unit 240 generates a command in which the interpreted meaning is replaced with standard text information "How far is it to Tokyo Station?." Thereby, even when there are text variations, it is possible to make it easy to obtain reply information.

The natural language processing unit 240 may interpret the meaning of text information using an artificial intelligence process such as a machine learning process using probabilities or may generate a command based on the interpretation result. The natural language processing unit 240 refers to commands in reply information 262 stored in the storage unit 260 using the generated command to acquire reply information associated with the matching command.

The dialogue generator 250 generates a voice for dialogue with the occupant on the basis of content acquired by the natural language processing unit 240. The dialogue generator 250 causes the communicator 210 to transmit the generated reply information such as a voice stream, text information, and images to the agent device 100.

The storage unit 260 is realized, for example, by an HDD, a flash memory, an EEPROM, a ROM, or a RAM. The storage unit 260 stores, for example, the reply information 262, the personal profile 264, and other information. The personal profile 264 is, for example, information in which voice feature information, a gender, an age, favorite genres, a past use history of the server device 200, and the like are associated with individual identification information.

[Initial Display of Agent Image]

Figure 5:
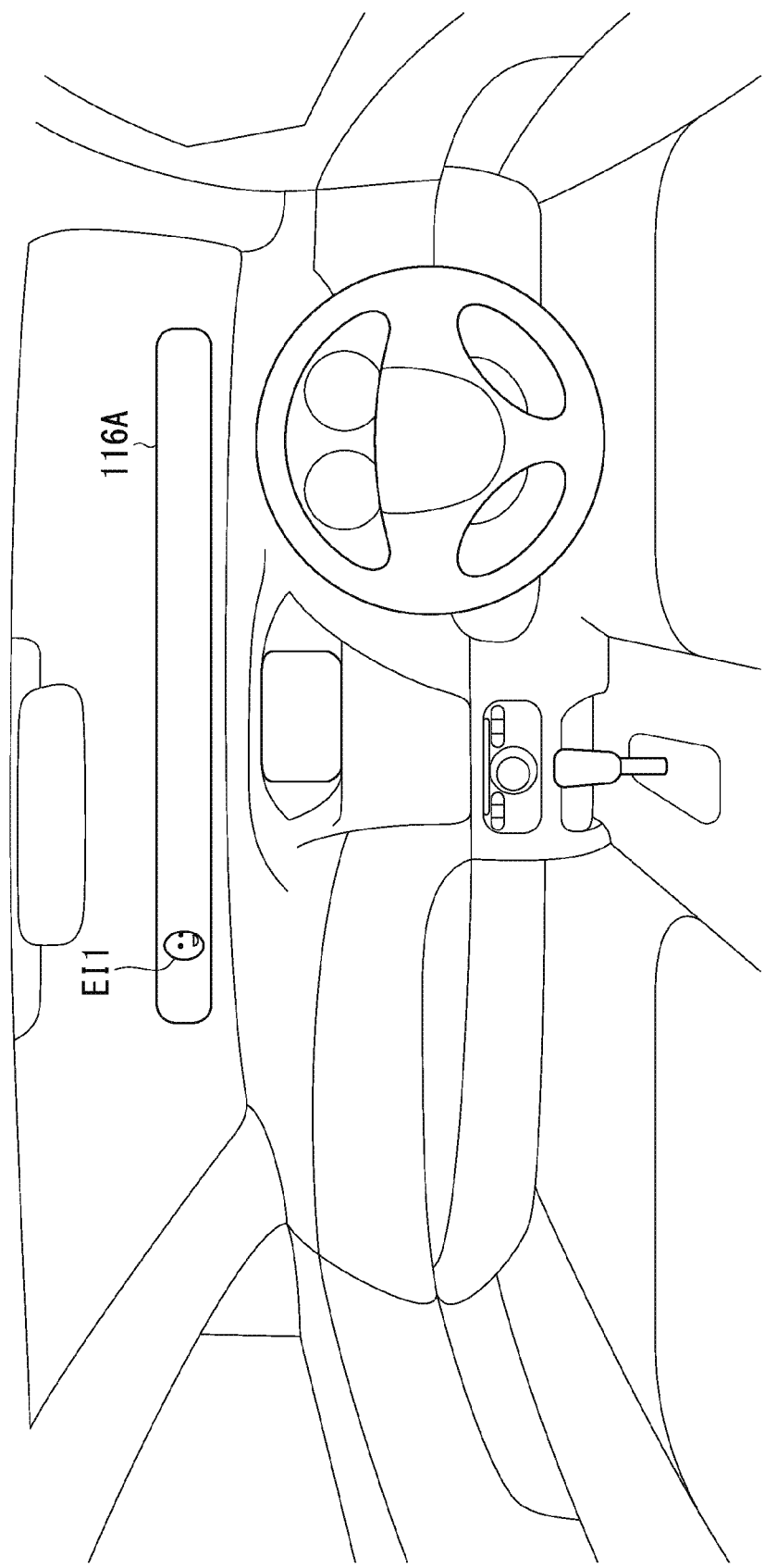
FIG. 5 is a diagram showing an example display of an agent image on a display unit.

FIG. 5 is a diagram showing an example of an agent image EI1 displayed on the display unit 116A. As described above, the agent image includes a facial image which enables its facial expression and face orientation to be recognized by the viewer. The example shown in FIG. 5 indicates a state in which the agent image EI1 is displayed such that occupants can recognize that the agent image EI1 faces toward the center of the occupant compartment.

When a result of analysis that the occupant state analyzer 156 has performed on the occupant's speech detected by the voice input unit 152 is that the occupant's speech includes a word or phrase that calls the agent, first, the agent controller 180 sets at least one occupant as a talking target before the agent responds to the occupant's speech, and displays an agent image on a partial area of the display unit 116A close to the occupant who is the talking target in a mode in which the face of the agent image is directed toward the talking target while the face orientation is recognizable, and further localizes a sound image at the display position.

When a direction in which the speaking person is present can be identified from the sound collection results of the microphones 114, the agent controller 180 uses the identified direction of the speaking person as a talking target. When the direction of the speaking person cannot be identified from the sound collection results of the microphones 114, the agent controller 180 may identify the direction of the speaking person from the imaging result of the vehicle interior camera 112. When the voice recognizer 230 can identify the gender and age of the speaking person, the agent controller 180 may identify the speaking person on the basis of both the identification result and the imaging result of the vehicle interior camera 112.

When there is only an occupant seated in the driver's seat ST1, the agent controller 180 recognizes that the speaking person is the occupant seated in the driver's seat ST1. When the speaking person cannot be identified, the occupant state analyzer 156 may preferentially select an occupant other than the occupant seated in the driver's seat ST1 as a talking target and, when there is an occupant seated in the front passenger seat ST2, the occupant state analyzer 156 may preferentially select the occupant as a talking target. Thus, whether or not it is necessary to change the talking target can be determined with reference to reactions of the occupant seated in the front passenger seat ST2. It is considered that an occupant seated in the driver's seat ST1 faces the traveling direction of the vehicle M for driving operations or the like for a long time and is less likely to watch the agent image. That is, there is a possibility that reactions as to whether the face orientation of the agent image is correct cannot be sufficiently obtained from the occupant seated in the driver's seat ST1. Therefore, the agent controller 180 preferentially selects the occupant seated in the front passenger seat ST2 as a talking target.

Figure 6:
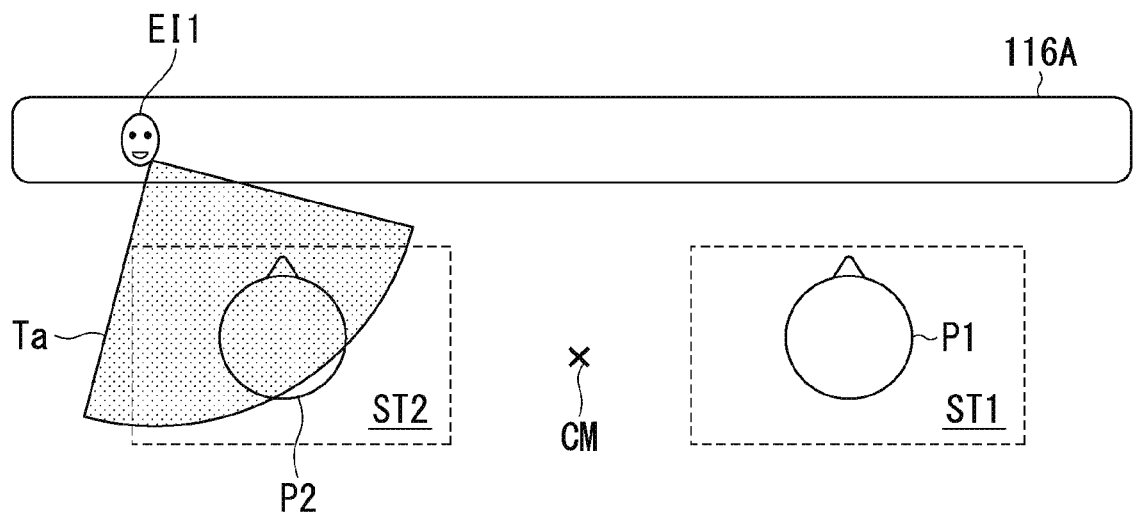
FIG. 6 is a diagram showing the positional relationship between a display unit of the vehicle and the seating positions of occupants.

FIG. 6 is a diagram showing the positional relationship between the display unit 116 of the vehicle M and the seating positions of occupants. When the direction of the speaking person cannot be identified, the occupant state analyzer 156 causes an agent image EI1 which faces an arbitrary direction to be displayed as an initial display. The arbitrary direction is, for example, a direction toward a region Ta shown in FIG. 6.

[Change in Display Mode of Agent Image Accompanying Occupant's Speech]

When the occupant state analyzer 156 has detected an occupant's speech relating to the face orientation of the agent image after the initial display of the agent image, the agent controller 180 controls the display unit 116 such that the face orientation of the agent image is toward a different direction from the direction toward an occupant who has been a talking target.

The speech relating to the face orientation of the agent image is, for example, a speech by a speaking person such as "This is it," "Here," "Not that," or "Not there" or a speech by an occupant who has been recognized as a talking target such as "Not me" or "Dad." Repeating a name (nickname) to call the agent image may be included in the speech relating to the face orientation of the agent image. When the occupant state analyzer 156 has detected an occupant's gesture of shaking his or her hand or pointing a finger toward another occupant from a result of analysis that it has performed on the imaging result of the vehicle interior camera 112, the agent controller 180 may interpret the meaning of the gesture and change the direction of the talking target to a different direction.

When, compared to a sound pressure at the time of calling the agent recognized by the voice input unit 152, an increase rate of a sound pressure of an occupant's voice subsequently recognized by the voice input unit 152 is a predetermined rate or more, the agent controller 180 may interpret that the occupant is urging the agent to pay attention or that an irritating feeling of the occupant is included, and perform control for changing the face orientation of the agent image.

When letting the agent image change its talking target, the agent controller 180 adopts a specific direction interpreted by the natural language processing unit 240 as the change destination if there is such a specific direction. The specific direction interpreted by the natural language processing unit 240 is, for example, a direction toward the seating location of an occupant where a speech by a speaking person such as "This is it" has been detected.

If there is no specific direction when letting the agent image change the talking target, the agent controller 180 may change the face orientation of the agent image such that the agent image faces opposite to the original talking target or may change it such that the agent image faces toward an arbitrary occupant other than the talking target. After changing the face orientation of the agent image, the agent controller 180 may make the face orientation of the agent image non-directional when the occupant state analyzer 156 has further performed interpretation regarding the face orientation of the agent image. To make the face orientation of the agent image non-directional is, for example, to make it face toward the vicinity CM of the center between the driver's seat ST1 and the front passenger seat ST2, to make it face toward the ceiling of the vehicle M, or to make it look around the occupant compartment without its line of sight concentrating on one point.

Even when the occupant P1 is a speaking person, the agent controller 180 continues to respond to the occupant P2 as a talking target if the occupant P2 starts a dialogue with the agent image without reacting to correct the face orientation of the agent image.

Upon recognizing that an occupant seated in the front passenger seat ST2 is a talking target from a result of analysis that the occupant state analyzer 156 has performed on a reaction of the occupant seated in the front passenger seat ST2, the agent controller 180 causes the voice generator 164 to generate a response voice such as "What can I do for you?" generated by the dialogue generator 250. Upon recognizing that an occupant seated in the driver's seat ST1 is a talking target from a result of analysis that the occupant state analyzer 156 has performed on a reaction of an occupant seated in the front passenger seat ST2, the agent controller 180 causes the voice generator 164 to generate a response voice generated by the dialogue generator 250 after changing the face orientation of the agent.

Figure 7:
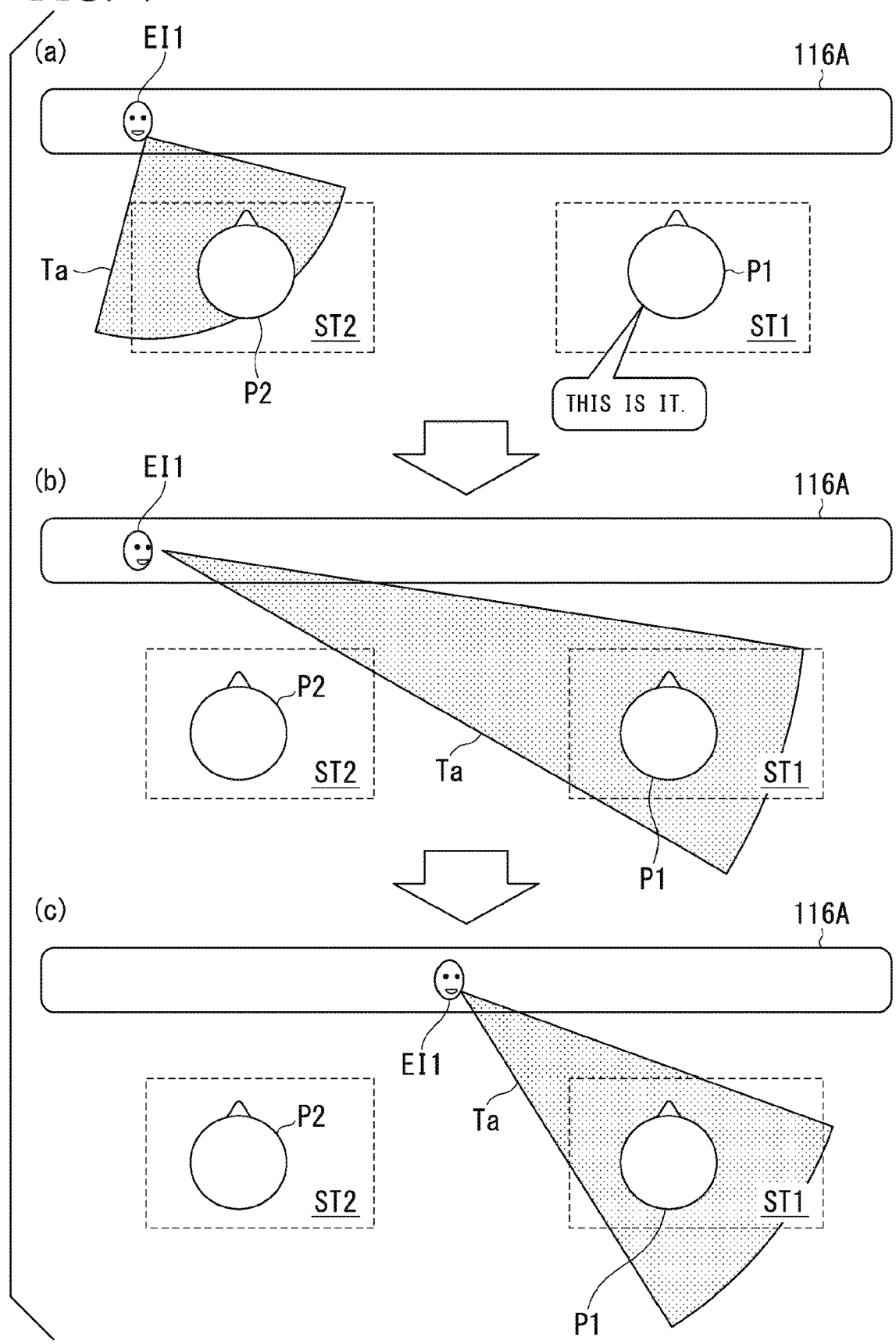
FIG. 7 is a diagram schematically showing how an agent image changes its talking target.

FIG. 7 is a diagram schematically showing how the agent image EI1 changes its talking target. When the occupant state analyzer 156 cannot identify which occupant is a speaking person although one of an occupant P1 seated in the driver's seat ST1 and an occupant P2 seated in the front passenger seat ST2 has requested that the agent image EI1 be displayed, the agent controller 180 sets the occupant P2 as a talking target and displays the agent image EI1 such that the face orientation of the agent image EI1 is toward a region Ta containing the front passenger seat ST2 as an initial display as shown in FIG. 7(a).

The agent controller 180 interprets a speech by the occupant P1 such as "This is it" as a speech relating to the face orientation, and determines to change the talking target to the occupant P1 and changes the face orientation of the agent image EI1 toward a region Ta containing the driver's seat ST1 as shown in FIG. 7(b).

When changing the face orientation of the agent image EI1, the agent controller 180 may also change the display position of the agent image EI1. The occupant P1 may feel that it is difficult to view the agent image EI1, for example, when the occupant P1 is driving with the agent image EI1 being displayed on a left end portion of the display unit 116A as shown in FIGS. 7(a) and 7(b). Therefore, the position where the agent image EI1 is displayed may be moved near the center of the display unit 116A during the response as shown in FIG. 7(c).

[Method for Estimating Talking Target of Speaking Person]

Hereinafter, a method for estimating a speaking person and a talking target of the speaking person by the agent controller 180 will be described. The agent controller 180 estimates a speaking person and whether the talking target of the speaking person is an agent image or another occupant on the basis of the imaging result of the vehicle interior camera 112 and the sound collection results of the microphones 114.

The agent controller 180 analyzes the position and orientation of each occupant's face from the imaging result of the vehicle interior camera 112 and identifies occupants whose mouths are open. In addition, the agent controller 180 analyzes the sound collection results of the microphones 114 recognized by the voice recognizer 230 to estimate which occupant is the speaking person among the occupants whose mouths are open.

Next, the agent controller 180 estimates whether the talking target of the speaking person is an agent image or another occupant. The agent controller 180 may employ the same estimation method or different estimation methods for both the case where the speaking person is an occupant seated in the driver's seat ST1 and the case where the speaking person is another occupant.

The agent controller 180 estimates the talking target mainly on the basis of voice when the speaking person is an occupant seated in the driver's seat ST1 and the occupant is driving. This is because changes in the facial expression, changes in the position of the pupil, and changes in the face orientation of the occupant who is driving may not be obtained as expected. On the other hand, when the speaking person is an occupant other than the occupant seated in the driver's seat ST1, the agent controller 180 may estimate a talking target of the speaking person on the basis of both the imaging result and voice since it is highly likely that the agent controller 180 is able to estimate a talking target of the speaking person on the basis of changes in the facial expression, changes in the position of the pupil, changes in the face orientation, or the like.

For example, the agent controller 180 identifies that the talking target is an agent image when a silent time equal to or greater than a threshold (for example, about 1 to 2 seconds) has been detected after completion of the occupant's speech as a result of analyzing the voice collected by the microphones 114 or a result of analyzing the imaging of the vehicle interior camera 112. In general, in the case of a dialogue between occupants, it is highly likely that, when one occupant has completed a speech that ends in the form of a question like "Is it raining tomorrow?," another occupant will respond with "Umm," "Uh," "Well," "Speaking of which, the weather forecast said it will fine," or the like without leaving a space after completion of the speech. Accordingly, when a speech by a speaking person ends in the form of a question and a silent time equal to or greater than a threshold is detected after the speech completes, the agent controller 180 identifies that the speech by the speaking person is a speech for the agent image.

The agent controller 180 may perform component analysis on a voice collected by the microphones 114 to evaluate an occupant's speech and identify the talking target on the basis of the evaluation result. The agent controller 180 evaluates, for example, speech intonations and tones (pitches) of the speaking person. For example, in the case where a tendency that a speaking person speaks more clearly with an intonation when inputting a speech to the device than during a normal dialogue is stored in the personal profile 264, the agent controller 180 identifies that the talking target is the agent image when such a feature has been detected from the speech voice of the speaking person.

[Process Flow 1]

Figure 8:
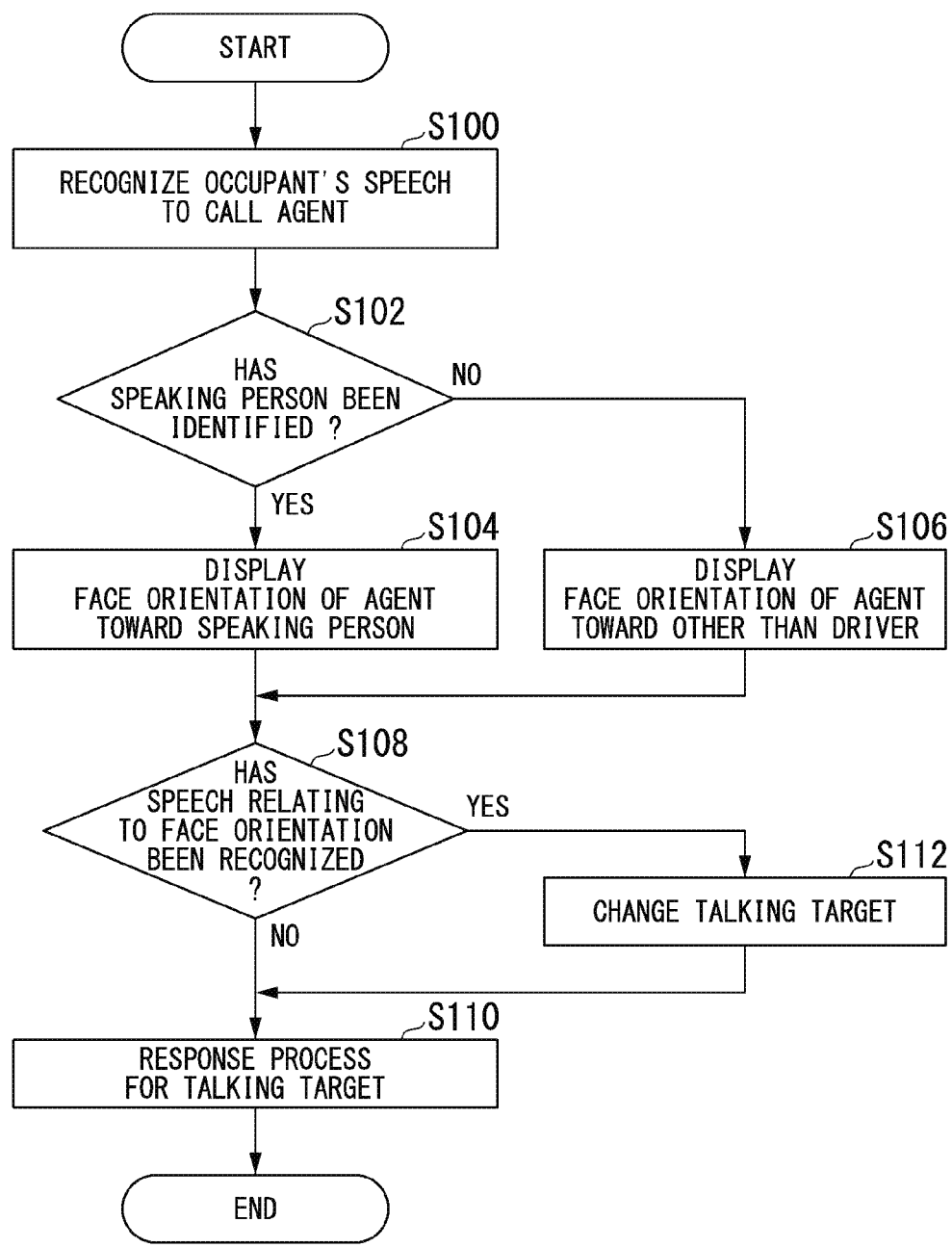
FIG. 8 is a flowchart showing an example of a process flow when the agent device detects a speech relating to a face orientation.

Hereinafter, a flow of a series of processes performed by the agent controller 180 will be described using a flowchart. FIG. 8 is a flowchart showing an example of a process flow when the agent device 100 detects a speech relating to the face orientation.

First, the natural language processing unit 240 recognizes an occupant's speech to call an agent image (step S100). Next, the occupant state analyzer 156 determines whether or not the speaking person of a voice recognized by the natural language processing unit 240 can be identified (step S102). When the speaking person can be identified, the agent controller 180 controls the face orientation of the agent image such that it is displayed toward the speaking person (step S104). When the speaking person cannot be identified, the agent controller 180 controls the face orientation of the agent image such that it is displayed toward an occupant seated in the front passenger seat (step S106). In step S106, the agent controller 180 may move the display position of the agent image to a partial area of the display unit 116 close to the occupant seated in the front passenger seat.

After the process of step S104 or step S106, the natural language processing unit 240 determines whether or not an occupant's speech relating to the face orientation of the agent image has been recognized (step S108). When a speech relating to the face orientation has not been recognized, the agent controller 180 performs a response process for the talking target (step S110). When a speech relating to the face orientation has been recognized, the agent controller 180 changes the talking target of the agent image (step S112) and performs the process of step S110. This is the end of the description of the process of this flowchart.

[Change in Face Orientation of Agent Image Accompanying Occupant's Facial Expression Change]

When an occupant's facial expression change has been detected through analysis of a captured image of the vehicle interior camera 112 by the occupant state analyzer 156 after the initial display of the agent image, the agent controller 180 controls the display unit 116 such that the face orientation of the agent image is toward a different direction from the original direction. For example, even when a negative facial expression change of an occupant who is the talking target has been detected from the captured image of the vehicle interior camera 112, the agent controller 180 changes the face orientation of the agent image in the same manner. The negative facial expression change is, for example, a facial expression classified as surprise, irritation, or confusion. The agent controller 180 does not detect presence of a negative facial expression change if the occupant's facial expression was the same before the agent image is displayed.

[Process Flow 2]

Figure 9:
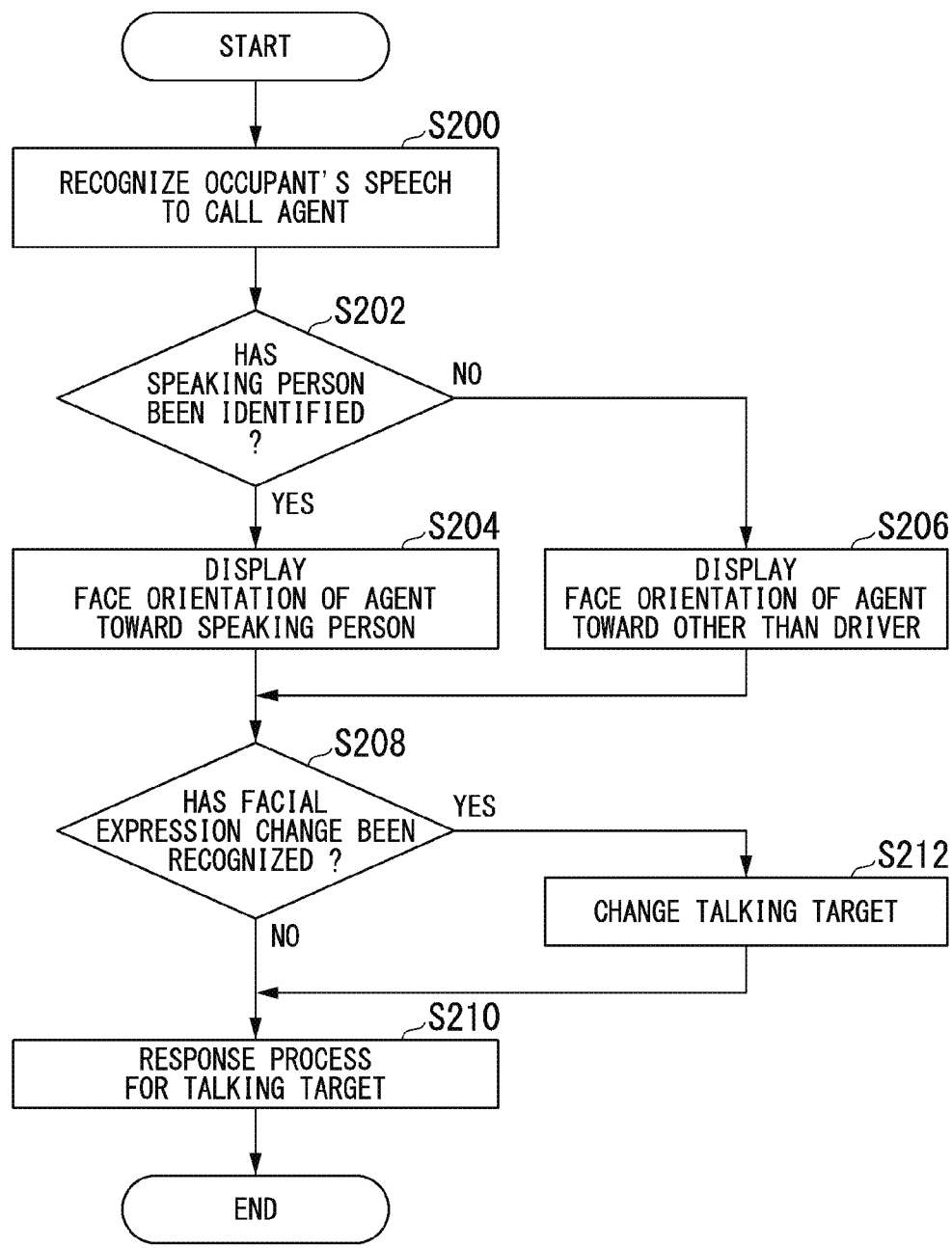
FIG. 9 is a flowchart showing an example of a process flow when the agent device detects a facial expression change.

FIG. 9 is a flowchart showing an example of a process flow when the agent device 100 detects a facial expression change. Steps S200 to S206 and S210 to S212 in the flowchart shown in FIG. 9 correspond to steps S100 to S106 and S110 to S112 in the flowchart shown in FIG. 8.

First, the natural language processing unit 240 recognizes an occupant's speech to call an agent image (step S200). Next, the occupant state analyzer 156 determines whether or not the speaking person of a voice recognized by the natural language processing unit 240 can be identified (step S202). When the speaking person can be identified, the agent controller 180 controls the face orientation of the agent image such that it is displayed toward the speaking person (step S204). When the speaking person cannot be identified, the agent controller 180 controls the face orientation of the agent image such that it is displayed toward an occupant seated in the front passenger seat (step S206).

After step S204 or step S206, the occupant state analyzer 156 determines whether or not an occupant's facial expression change has been recognized (step S208). When an occupant's facial expression change has not been recognized, the agent controller 180 performs a response process for the talking target (step S210). When an occupant's facial expression change has been recognized, the agent controller 180 changes the talking target of the agent image (step S212) and performs the process of step S210. This is the end of the description of the process of this flowchart.

[Initial Display of Agent Image when Speaking Person is Unknown]

Figure 10:
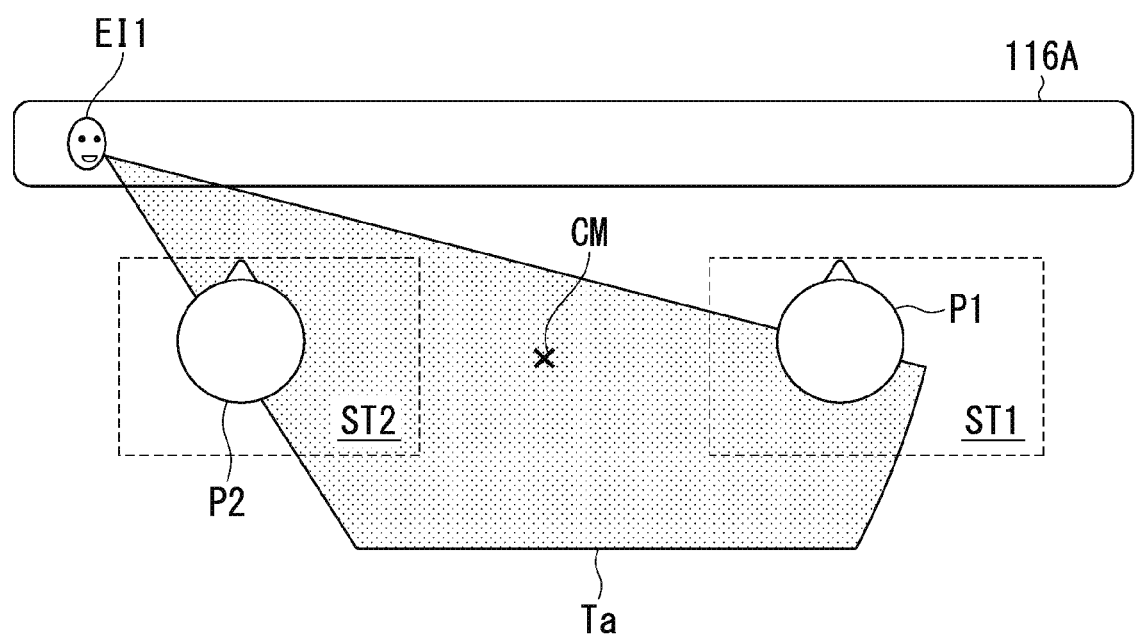
FIG. 10 is a diagram showing an initial display position of the agent image when a speaking person is unknown.

FIG. 10 is a diagram showing an initial display position of the agent image EI1 when the speaking person is unknown. When the agent controller 180 cannot estimate which occupant has spoken, the agent controller 180 may display the agent image EI1 such that it faces toward a region Ta containing all occupants from a left end portion of the display unit 116A, assuming that all occupants in the occupant compartment are talking targets, as shown in FIG. 10. When there is no occupant seated in the front passenger seat ST2 and there is an occupant P3 seated in the rear seat ST3, the agent controller 180 may set the face orientation of the agent image EI1 toward a region Ta assuming that the occupant P3 seated in the rear seat ST3 is a talking target.

[Display Position in which Interpretation Result of Speech Content is Reflected]

The agent controller 180 may interpret the meaning of content of the response and change the talking target to an occupant other than the speaking person. For example, when an occupant seated in the front passenger seat ST2 asks the agent image a driving operation question such as "What is the speed limit?" on behalf of an occupant seated in the driver's seat ST1, the agent controller 180 determines that it is desirable that the answer be spoken toward the occupant seated in the driver's seat ST1 and changes the talking target from the occupant seated in the front passenger seat ST2 who is the speaking person to the occupant seated in the driver's seat ST1. For example, when an occupant seated in the driver's seat ST1 who is driving has spoken the agent image a content playback instruction such as "Play movie" not relating to a driving operation on behalf of an occupant seated in the front passenger seat ST2, the agent controller 180 interprets that the speaking person's speech includes an intention to "desire content to be played such that other occupants can see it" and causes the content to be displayed on a partial area of the display unit 116 that is close to the position of the occupant to whom the content is to be displayed and that does not affect the driving operation.

Any of the identification/recognition methods described above may make a determination in a combined manner rather than in a definitive manner. For example, when it has been estimated with high certainty from analysis results of an image captured by the vehicle interior camera 112 and voice signals collected by the microphones 114 that an occupant seated in the front passenger seat ST2 is speaking, the agent controller 180 may cause the agent image to be displayed such that it faces the occupant seated in the front passenger seat ST2 even when the content of the speech relates to a driving operation if the occupant seated in the driver's seat ST1 is not paying attention to the agent image (for example, if he or she is turning right or left or opening a window and talking with a person outside the vehicle). In short, the agent controller 180 may set a weight and a priority for each determination element and make a comprehensive determination.

[Process Flow 3]

Figure 11:
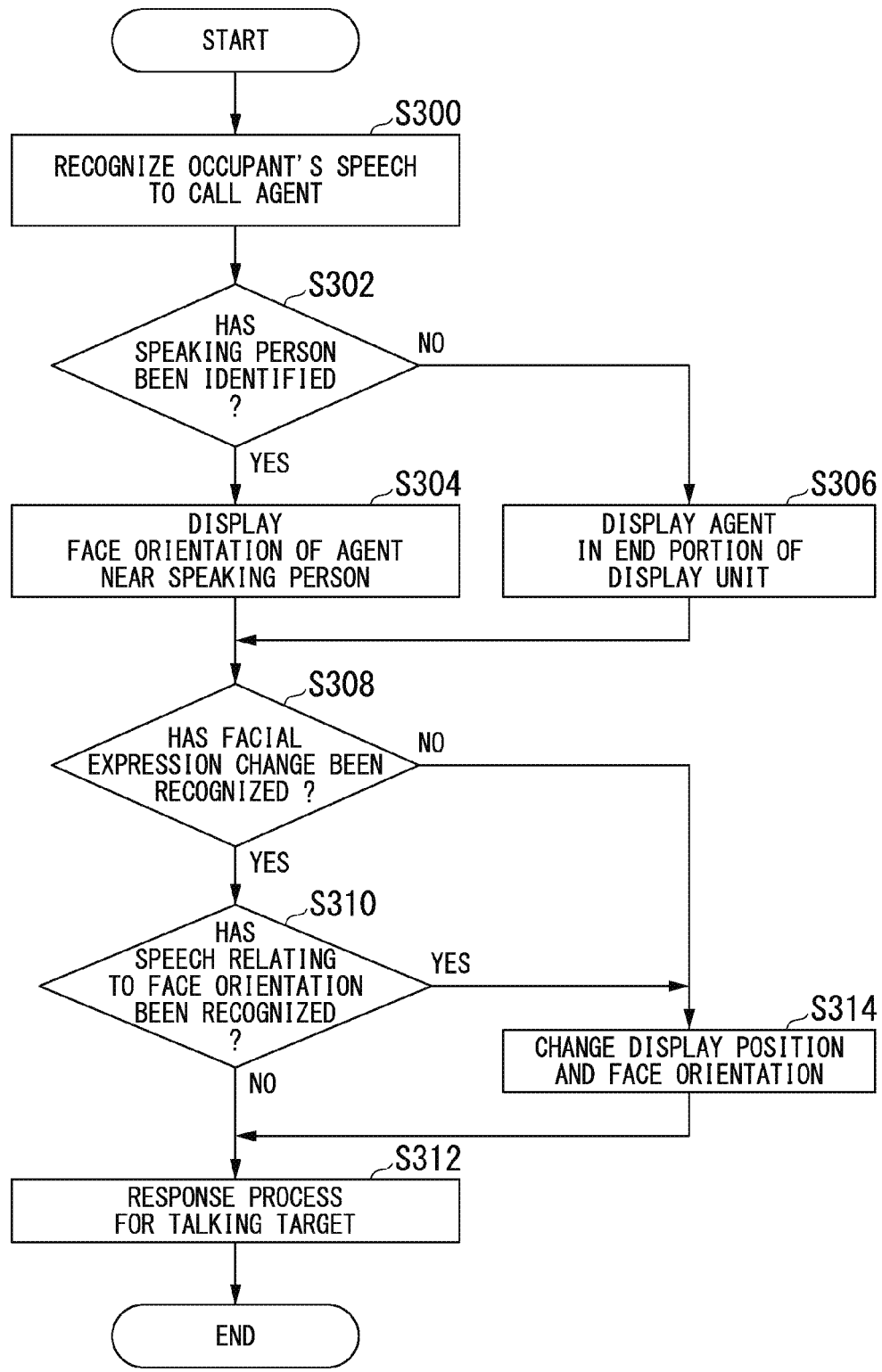
FIG. 11 is a flowchart showing an example of a flow of a series of processes performed by the agent device.

FIG. 11 is a flowchart showing an example of a flow of a series of processes performed by the agent device 100. Steps S300 to S302, S310, and S312 of the flowchart shown in FIG. 11 correspond to steps S100 to S102, S108, and S110 of the flowchart shown in FIG. 8 and step S308 of the flowchart shown in FIG. 11 corresponds to step S208 of the flowchart shown in FIG. 9.

First, the natural language processing unit 240 recognizes an occupant's speech to call an agent image (step S300). Next, the occupant state analyzer 156 determines whether or not the speaking person of a voice recognized by the natural language processing unit 240 can be identified (step S302). When the speaking person can be identified, the agent controller 180 controls the agent image such that it is displayed in a partial area close to the speaking person and controls the face orientation of the agent image such that it is displayed toward the speaking person (step S304). When the speaking person cannot be identified, the agent controller 180 controls the agent image such that it is displayed in a partial area close to an occupant seated in the front passenger seat and controls the face orientation of the agent image such that it is displayed toward the occupant seated in the front passenger seat (step S306).

After step S304 or step S306, the occupant state analyzer 156 determines whether or not an occupant's facial expression change has been recognized (step S308). When an occupant's facial expression change has not been recognized, the natural language processing unit 240 determines whether or not an occupant's speech relating to the face orientation of the agent image has been recognized (step S310). When a speech relating to the face orientation has not been recognized, the agent controller 180 performs a response process for the talking target (step S312). When an occupant's facial expression change has been recognized in step S308 or when a speech relating to the face orientation has been recognized in step S310, the agent controller 180 changes the talking target of the agent image (step S314) and performs the process of step S312. In step S314, the agent controller 180 may perform only one of the change of the face orientation and the change of the display position. This is the end of the description of the process of this flowchart.

According to the embodiment described above, the agent device includes the display unit 116, the microphone 114 configured to collect a voice in the occupant compartment, the plurality of speakers 118 configured to enable localization of a sound image through a combination of outputs, and the agent controller 180 configured to cause the display unit 116 to display an agent image and cause the speakers 118 to output sounds, wherein the agent controller 180 is configured to identify a speaking person who has spoken the voice collected by the microphone 114 among occupants in the vehicle and to cause the agent image to be displayed in a mode of talking to the occupant in a partial area of the display unit 116 near the speaking person while causing a sound image to be localized at a display position of the agent image, whereby it is possible to cause the agent to behave naturally.

Although the mode for carrying out the present invention has been described above by way of embodiments, the present invention is not limited to these embodiments at all and various modifications and substitutions may be made without departing from the spirit of the present invention.

What is claimed is:

1. An agent device comprising:
   a display unit;
   a microphone configured to collect a voice in an occupant compartment;
   a plurality of speakers configured to enable localization of a sound image through a combination of outputs; and
   an agent controller configured to cause the display unit to display an agent image and cause the speakers to output sounds,
   wherein the agent controller is configured to identify a speaking person who has spoken the voice collected by the microphone among occupants in a vehicle and to cause the agent image to be displayed in a mode of talking to the occupant in a partial area of the display unit near the speaking person while causing a sound image to be localized at a display position of the agent image,
   wherein the display unit has a display area that is wide enough that two or more of the occupants recognize the agent image as being displayed at a position facing the two or more occupants.

2. The agent device according to claim 1, wherein the display unit includes individual displays facing the occupants and/or includes a display provided over a vicinity of the plurality of occupants.

3. The agent device according to claim 2, further comprising a camera configured to image the occupant compartment,
   wherein the agent controller is configured to identify the speaking person by analyzing an image including the occupant captured by the camera.

4. The agent device according to claim 3, wherein the agent controller is configured to identify whether the speaking person is speaking toward the agent image or speaking to another occupant by analyzing the image including the occupant captured by the camera.

5. The agent device according to claim 4, wherein the agent controller is configured to identify that the speaking is for the agent image when a silent time equal to or greater than a threshold has been detected after the occupant completes the speaking as a result of analyzing the voice collected by the microphone or a result of analyzing the imaging of the camera.

6. The agent device according to claim 4, wherein the agent controller is configured to identify whether or not the speaking is for the agent image on the basis of an evaluation of component analysis of the voice collected by the microphone.

7. The agent device according to claim 4, wherein the agent controller is configured to identify that a driver has performed the speaking for the agent image when content indicated by the voice relates to a driving operation.

8. The agent device according to claim 1, wherein the agent controller is configured to make a localization position of the sound image non-directional when the speaking person cannot be determined.

9. The agent device according to claim 4, wherein the agent controller is configured to make a localization position of the sound image non-directional when the speaking person cannot be determined.

10. An agent device comprising:
    a display unit;
    a microphone configured to collect a voice in an occupant compartment;
    a plurality of speakers configured to enable localization of a sound image through a combination of outputs; and
    an agent controller configured to cause the display unit to display an agent image and cause the speakers to output sounds,
    wherein the agent controller is configured to be capable of changing a display position of the agent image on the display unit, and
    the agent controller is configured to identify a speaking person who has spoken the voice collected by the microphone among occupants in a vehicle and to set the display positon of the agent image based on the identified speaking person to cause the agent image to be displayed in a mode of talking to the occupant in a partial area of the display unit near the speaking person while causing a sound image to be localized at the set display position of the agent image,
    wherein the display unit has a display area that is wide enough that two or more of the occupants recognize the agent image as being displayed at a position facing the two or more occupants.

11. The agent device according to claim 10, wherein the agent controller is configured to cause the agent image to be displayed in the mode of talking to the occupant in the partial area of the display unit near the speaking person such that a face orientation of the agent image is toward the speaking person.

12. An agent device comprising:
    a display unit;
    a microphone configured to collect a voice in an occupant compartment;
    a plurality of speakers configured to enable localization of a sound image through a combination of outputs; and
    an agent controller configured to cause the display unit to display an agent image and cause the speakers to output sounds,
    wherein the agent controller is configured to identify a speaking person who has spoken the voice collected by the microphone among occupants in a vehicle, and to cause the agent image to be displayed in a mode of talking to the occupant in a partial area of the display unit near the speaking person such that a face orientation of the agent image is toward the speaking person while causing a sound image to be localized at a display position of the agent image,
    wherein the display unit has a display area that is wide enough that two or more of the occupants recognize the agent image as being displayed at a position facing the two or more occupants.

* * * * *